United States Patent
Oba et al.

(10) Patent No.: US 9,527,507 B2
(45) Date of Patent: Dec. 27, 2016

(54) HYBRID VEHICLE

(71) Applicant: TOYOTA JIDOSHA KABUSHIKI KAISHA, Toyota-shi, Aichi-ken (JP)

(72) Inventors: Tomoko Oba, Nagoya (JP); Masaya Kaji, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/073,975

(22) Filed: Mar. 18, 2016

(65) Prior Publication Data
US 2016/0280218 A1     Sep. 29, 2016

(30) Foreign Application Priority Data

Mar. 25, 2015   (JP) .................................. 2015-062375

(51) Int. Cl.
| | |
|---|---|
| B60L 3/04 | (2006.01) |
| B60W 20/00 | (2016.01) |
| B60K 6/26 | (2007.10) |
| B60K 6/365 | (2007.10) |
| B60K 6/50 | (2007.10) |
| B60K 1/00 | (2006.01) |
| B60K 6/28 | (2007.10) |

(52) U.S. Cl.
CPC .............. *B60W 20/50* (2013.01); *B60K 1/00* (2013.01); *B60K 6/26* (2013.01); *B60K 6/28* (2013.01); *B60K 6/365* (2013.01); *B60K 6/50* (2013.01); *B60K 2001/003* (2013.01); *B60W 2510/087* (2013.01)

(58) Field of Classification Search
CPC ... B60W 20/50; B60W 2510/087; B60K 6/26; B60K 6/365; B60K 6/50; B60K 6/28; B60K 1/00; B60K 2001/003
See application file for complete search history.

(56) References Cited

U.S. PATENT DOCUMENTS 9,205,834 B1 *  12/2015  Uehara ................ B60W 20/50
2005/0055141 A1    3/2005  Suzuki et al.
(Continued)

FOREIGN PATENT DOCUMENTS

| JP | 2005-83300 | 3/2005 |
|---|---|---|
| JP | 2005-86848 | 3/2005 |

(Continued)

*Primary Examiner* — John Walters
*Assistant Examiner* — Brian Swenson
(74) *Attorney, Agent, or Firm* — Finnegan, Henderson, Farabow, Garrett & Dunner, LLP

(57) ABSTRACT

An electronic control unit included in a hybrid vehicle is configured to switch between first limp home travel control and second limp home travel control based on a first temperature difference, a second temperature difference, and a state of charge when abnormality occurs to a cooler. The first temperature difference is a value that is obtained by subtracting an element temperature of a first inverter from a first load rate limit temperature at which load rate limitation is applied to a first motor. The second temperature difference is a value that is obtained by subtracting an element temperature of a second inverter from a second load rate limit temperature at which the load rate limitation is applied to a second motor.

10 Claims, 7 Drawing Sheets

(56) References Cited

U.S. PATENT DOCUMENTS

| | | | | |
|---|---|---|---|---|
| 2009/0058339 A1* | 3/2009 | Kitano | .................. | B60K 6/445 |
| | | | | 318/400.22 |
| 2013/0343105 A1 | 12/2013 | Kosugi | | |
| 2014/0114523 A1* | 4/2014 | Hirasawa | ............... | B60K 6/445 |
| | | | | 701/22 |
| 2014/0132190 A1* | 5/2014 | Kitano | .................. | B60L 3/003 |
| | | | | 318/400.22 |
| 2015/0321664 A1* | 11/2015 | Bae | ...................... | B60W 10/08 |
| | | | | 701/22 |

FOREIGN PATENT DOCUMENTS

| | | |
|---|---|---|
| JP | 2007-203883 | 8/2007 |
| JP | 2009-171766 | 7/2009 |
| JP | 2009-254178 | 10/2009 |
| JP | 2010-124628 | 6/2010 |
| WO | WO 2012/124073 A1 | 9/2012 |

* cited by examiner

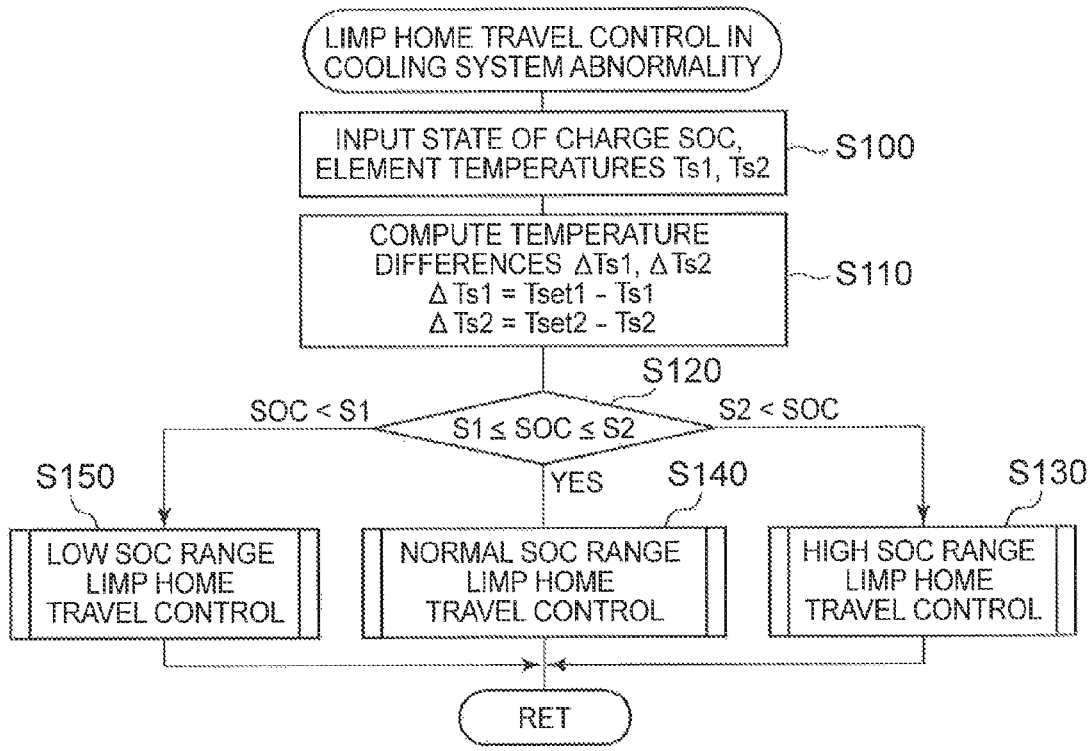
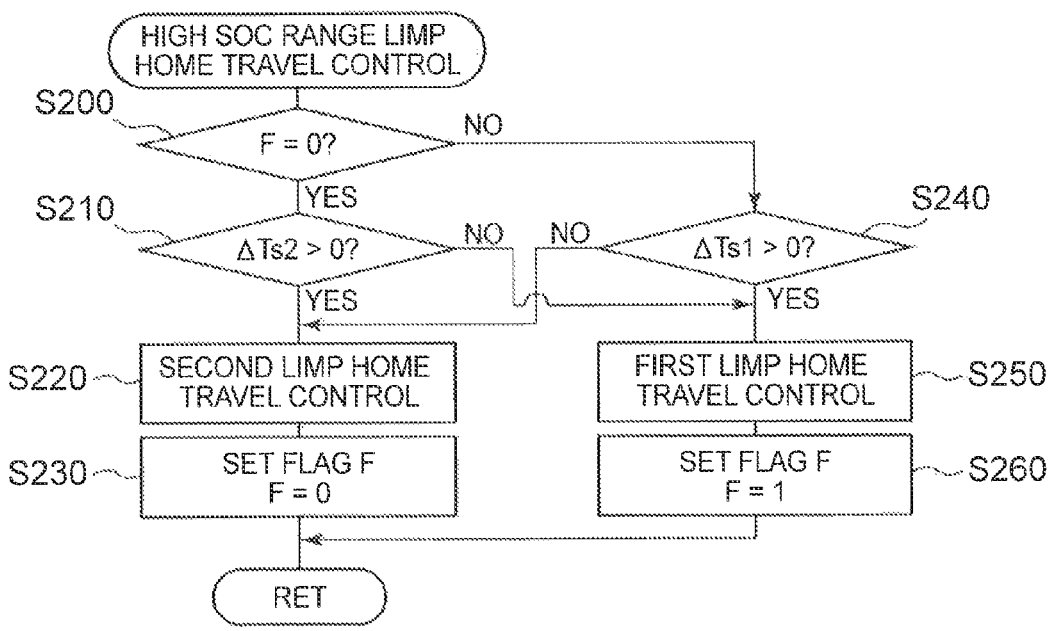

HYBRID VEHICLE

INCORPORATION BY REFERENCE

The disclosure of Japanese Patent Application No. 2015-062375 filed on Mar. 25, 2015 including the specification, drawings and abstract is incorporated herein by reference in its entirety.

BACKGROUND OF THE INVENTION

1. Field of the Invention

The invention relates to a hybrid vehicle and, in particular, to a hybrid vehicle that includes: an engine: a first motor capable of inputting/outputting power; a planetary gear mechanism, three rotation elements of which are connected to three shafts as an output shaft of the engine, a rotary shaft of the first motor, and a drive shaft that is coupled to an axle shaft; and a second motor capable of inputting/outputting the power to/from the drive shaft.

2. Description of Related Art

Conventionally, as a hybrid vehicle of this type, a hybrid vehicle has been suggested that is configured that an engine and two motors are connected by a planetary gear mechanism and that limits load rates of the motors when an element temperature of an inverter becomes at least equal to a specified temperature (see International Publication No. 2012/124073, for example). In this hybrid vehicle, a further increase in the element temperature of the inverter is suppressed by limiting the load rates of the motors.

However, there is a case where the above-described hybrid vehicle cannot sufficiently make a limp home travel when abnormality occurs to a cooler for cooling the inverter. The limp home travel is typically made by a motor travel. However, when the element temperature of the inverter becomes at least equal to the specified temperature, limitation is applied to the load rates of the motors. As a result, it becomes difficult to make the limp home travel. Thus, a measure against the abnormality in the cooler for the inverter is desired.

SUMMARY OF THE INVENTION

This invention provides a hybrid vehicle appropriately making a limp home travel when abnormality occurs to a cooler for cooling an inverter.

A hybrid vehicle related to the invention includes: an engine; a first motor capable of inputting/outputting power; a first inverter for driving the first motor; a planetary gear mechanism having three rotation elements, the three rotation elements being respectively connected to three shafts as an output shaft of the engine, a rotary shaft of the first motor, and a drive shaft that is coupled to an axle shaft; a second motor capable of inputting/outputting power to/from the drive shaft; a second inverter for driving the second motor; a battery for receiving/transmitting electric power from/to the first motor and the second motor via the first inverter and the second inverter; and a cooler for cooling at least the first inverter and the second inverter. The hybrid vehicle includes an electronic control unit for switching between and executing first limp home travel control for controlling the engine, the first motor, and the second motor such that the vehicle travels not by using the power from the second motor but by using the power from the engine and the first motor and second limp home travel for controlling the engine, the first motor, and the second motor such that the vehicle travels not by using the power from the engine and the first motor but by using the power from the second motor based on a first temperature difference that is obtained by subtracting an element temperature of the first inverter from a first load rate limit temperature at which load rate limitation is applied to the first motor, a second temperature difference that is obtained by subtracting an element temperature of the second inverter from a second load rate limit temperature at which the load rate limitation is applied to the second motor, and a state of charge as a ratio of remaining charging capacity to full charging capacity of the battery when abnormality occurs to the cooler.

According to this hybrid vehicle, when the abnormality occurs to the cooler, the normal limp home travel control is not executed, but the first limp home travel control and the second limp home travel control are switched based on the first temperature difference, the second temperature difference, and the state of charge of the battery. When the first limp home travel control is executed, the element temperature of the first inverter is increased due to driving of the first motor. However, the element temperature of the second inverter is suppressed from being increased or lowered because the power from the second motor is not used. On the other hand, when the second limp home travel control is executed, the element temperature of the second inverter is increased due to driving of the second motor. However, the element temperature of the first inverter is suppressed from being increased or lowered because the power from the first motor is not used. Accordingly, when the limp home travel is made by switching between the first limp home travel control and the second limp home travel control, the temperatures of the element of the first inverter and the element of the second inverter can be suppressed from being simultaneously increased, and thereby the load rate limitation can be suppressed from being applied to the first motor and the second motor in the relatively short time. Thus, a limp home travel distance can be extended. As a result, the limp home travel can further appropriately be made.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a flowchart that illustrates one example of limp home travel control in cooling system abnormality that is executed by an HVECU 70;

FIG. 3 is a flowchart that illustrates one example of high SOC range limp home travel control;

DETAILED DESCRIPTION OF EMBODIMENTS

Figure 1:
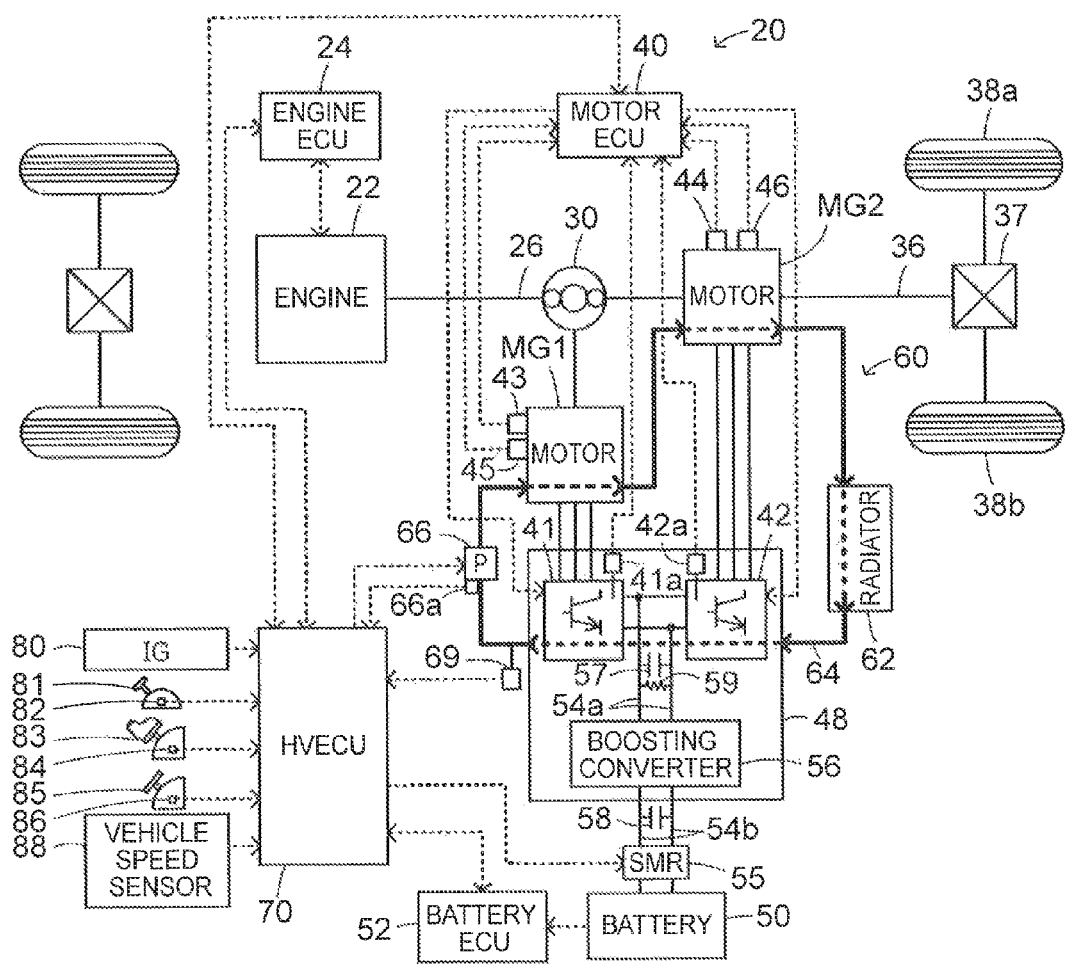
FIG. 1 is a configuration diagram for schematically showing a configuration of a hybrid vehicle 20 as an embodiment of the invention.

The hybrid vehicle includes: an engine; a first motor capable of inputting/outputting power; a first inverter for driving the first motor; a planetary gear mechanism having three rotation elements, the three rotation elements being respectively connected to three shafts as an output shaft of the engine, a rotary shaft of the first motor, and a drive shaft that is coupled to an axle shaft; a second motor capable of inputting/outputting power to/from the drive shaft; a second inverter for driving the second motor; a battery for receiving/transmitting electric power from/to the first motor and the second motor via the first inverter and the second inverter; and a cooler for cooling at least the first inverter and the second inverter. The hybrid vehicle includes an electronic control unit for switching between and executing first limp home travel control for controlling the engine, the first motor, and the second motor such that the vehicle travels not by using the power from the second motor but by using the power from the engine and the first motor and second limp home travel for controlling the engine, the first motor, and the second motor such that the vehicle travels not by using the power from the engine and the first motor but by using the power from the second motor based on a first temperature difference that is obtained by subtracting an element temperature of the first inverter from a first load rate limit temperature at which load rate limitation is applied to the first motor, a second temperature difference that is obtained by subtracting an element temperature of the second inverter from a second load rate limit temperature at which the load rate limitation is applied to the second motor, and a state of charge as a ratio of remaining charging capacity to full charging capacity of the battery when abnormality occurs to the cooler.

In this hybrid vehicle, the limitation is applied to a load rate of the first motor when the element temperature of the first inverter is the first load rate limit temperature (the first temperature difference has a value 0), and the limitation is applied to a load rate of the second motor when the element temperature of the second inverter is the second load rate limit temperature (the second temperature difference has a value 0). Meanwhile, in the hybrid vehicle of this embodiment, normal limp home travel control, the first limp home travel control, and the second limp home travel control can be executed as limp home travel control. In the normal limp home travel control, the engine, the first motor, and the second motor are controlled such that the vehicle travels by using the power from the engine, the first motor, and the second motor, similar to normal travel control. In the first limp home travel control, the engine, the first motor, and the second motor are controlled such that the vehicle travels not by using the power from the second motor but by using the power from the engine and the first motor. In the second limp home travel control, the engine, the first motor, and the second motor are controlled such that the vehicle travels not by using the power from the engine and the first motor but by using the power from the second motor. In a case where the normal limp home travel control is executed when abnormality occurs to the cooler for cooling the first inverter and the second inverter, driving of the first motor and driving of the second motor are controlled. Accordingly, the temperatures of the element of the first inverter and the element of the second inverter are simultaneously increased, and the load rate limitation is applied to the first motor and the second motor in a relatively short time. However, in the hybrid vehicle of this embodiment, when the abnormality occurs to the cooler, the normal limp home travel control is not executed, but the first limp home travel control and the second limp home travel control are switched based on the first temperature difference, the second temperature difference, and the state of charge of the battery. When the first limp home travel control is executed, the element temperature of the first inverter is increased due to driving of the first motor. However, the element temperature of the second inverter is suppressed from being increased or lowered because the power from the second motor is not used. On the other hand, when the second limp home travel control is executed, the element temperature of the second inverter is increased due to driving of the second motor. However, the element temperature of the first inverter is suppressed from being increased or lowered because the power from the first motor is not used. Accordingly, when the limp home travel is made by switching between the first limp home travel control and the second limp home travel control, the temperatures of the element of the first inverter and the element of the second inverter can be suppressed from being simultaneously increased, and thereby the load rate limitation can be suppressed from being applied to the first motor and the second motor in the relatively short time. Thus, a limp home travel distance can be extended. As a result, the limp home travel can further appropriately be made.

In the hybrid vehicle, the electronic control unit may be configured to shut down the second inverter while the first limp home travel control is executed and to shut down the first inverter while the second limp home travel control is executed. In this way, the element temperature of the second inverter can be lowered while the first limp home travel control is executed, and the element temperature of the first inverter can be lowered while the second limp home travel control is executed. Accordingly, the first limp home travel control and the second limp home travel control can alternately be executed. Therefore, the limp home travel distance can further be extended.

The hybrid vehicle, the electronic control unit may be configured to preferentially execute the second limp home travel control over the first limp home travel control when the state of charge is larger than an upper limit value of a normal control range. This is based on a fact that the second limp home travel control is a control by which the limp home travel is made in conjunction with discharging of the battery and the first limp home travel control is a control by which the limp home travel is made in conjunction with charging of the battery. That is, when the state of charge is larger than the upper limit value of the normal control range, the state of charge of the battery can approach the normal control range by prioritizing the second limp home travel control accompanied by discharging of the battery, and overcharging of the battery can be suppressed. Here, the normal control range is a control range that is defined in advance as the state of charge of the battery when the abnormality does not occur to the cooler and the like and all of the equipment is operated normally, and is a range that is defined to have a lower limit value of 30%, 40%, or the like and the upper limit value of 50%, 60%, or the like, for example. The same applies to the following "normal control range". In the hybrid vehicle of this embodiment, the electronic control unit may be configured to switch between and execute the first limp home travel control that is executed until the first temperature difference reaches (i.e. becomes equal to or higher than) a first threshold and the second limp home travel control that is executed until the second temperature difference reaches (i.e. becomes equal to or higher than) the first threshold when the state of charge is larger than the upper limit value of the normal control range. That is, when the limp home travel is made, first, the second limp home travel control that is executed until the second temperature difference reaches (i.e. becomes equal to or higher than) the first threshold is executed. Thereafter, the first limp home travel control that is executed until the first temperature difference reaches (i.e. becomes equal to or higher than) the first threshold is executed. Then, execution of the second limp home travel control and execution of the first limp home travel control are alternately repeated. In this way, the limp home travel distance can further be extended. Here, as the first threshold, a value 0 can be used, or 5° C., 10° C., or the like can be used. In this case, the electronic control unit may be configured to switch from the execution of the first limp home travel control to the execution of the second limp home travel control regardless of the first temperature difference in a case where the state of charge reaches (i.e. becomes equal to or higher than) a permissible maximum value that is defined in advance while the first limp home travel control is executed. In this way, charging by which the state of charge of the battery exceeds the permissible maximum value can be avoided.

In the hybrid vehicle, the electronic control unit may be configured to switch between and execute the second limp home travel control that is executed until the second temperature difference reaches (i.e. becomes equal to or higher than) a second threshold and the first limp home travel control that is executed until the first temperature difference reaches (i.e. becomes equal to or higher than) the second threshold in a case where one of the first temperature difference and the second temperature difference is larger than the second threshold when the state of charge is within the normal control range. Here, as the second threshold, 10° C., 20° C., 30° C., or the like can be used. In this way, the first limp home travel control and the second limp home travel control can be switched in a state where temperature increases in the element of the first inverter and the element of the second inverter have certain margins, and the state of charge of the battery can be kept within the normal control range for a longer period. In the hybrid vehicle, the electronic control unit may be configured to switch between and execute the first limp home travel control that is executed until the first temperature difference reaches (i.e. becomes equal to or higher than) a third threshold that is smaller than the second threshold and the second limp home travel control that is executed until the second temperature difference reaches (i.e. becomes equal to or higher than) the third threshold in a case where the first temperature difference and the second temperature difference are at most equal to the second threshold when the state of charge is within the normal control range. Here, as the third threshold, the value 0 can be used, or 5° C., 10° C., or the like can be used. In this way, the state of charge of the battery can be kept within the normal control range for the longer period, and the further long limp home travel can be made.

In the hybrid vehicle, the electronic control unit may be configured to preferentially execute the first limp home travel control over the second limp home travel control when the state of charge is smaller than the lower limit value of the normal control range. This is based on the fact that the first limp home travel control is the control by which the limp home travel is made in conjunction with charging of the battery and the second limp home travel control is the control by which the limp home travel is made in conjunction with discharging of the battery. That is, when the state of charge is smaller than the lower limit value of the normal control range, the first limp home travel control that is accompanied by charging of the battery is prioritized, and thereby overdischarging of the battery can be suppressed. In the hybrid vehicle, the electronic control unit may be configured to switch between and execute the first limp home travel control that is executed until the first temperature difference reaches (i.e. becomes equal to or higher than) a fourth threshold and the second limp home travel control that is executed until the second temperature difference reaches (i.e. becomes equal to or higher than) the fourth threshold when the state of charge is smaller than the lower limit value of the normal control range. That is, when the limp home travel is made, first, the first limp home travel control that is executed until the first temperature difference reaches (i.e. becomes equal to or higher than) the fourth threshold is executed. Thereafter, the second limp home travel control that is executed until the second temperature difference reaches (i.e. becomes equal to or higher than) the fourth threshold is executed. Then, execution of the first limp home travel control and execution of the second limp home travel control are alternately repeated. In this way, the limp home travel distance can further be extended. Here, as the fourth threshold, the value 0 can be used, or 5° C. 10° C., or the like can be used. In this case, the electronic control unit may be configured to switch from the execution of the second limp home travel control to the execution of the first limp home travel control regardless of the second temperature difference in a case where the state of charge reaches (i.e. becomes equal to or lower than) a permissible minimum value that is defined in advance while the second limp home travel control is executed. In this way, discharging by which the state of charge of the battery exceeds the permissible minimum value can be avoided.

FIG. 1 is a configuration diagram for schematically showing a configuration of a hybrid vehicle 20 as an embodiment of the invention. As shown in the diagram, the hybrid vehicle 20 of the embodiment includes an engine 22, an engine electronic control unit (hereinafter referred to as an engine ECU) 24, a planetary gear 30, a motor MG1, a motor MG2, inverters 41, 42, a motor electronic control unit (hereinafter referred to as a motor ECU) 40, a battery 50, a battery electronic control unit (hereinafter referred to as a battery ECU) 52, a boosting converter 56, an HV unit cooler 60, and a hybrid electronic control unit (hereinafter referred to as an HVECU) 70.

The engine 22 is configured as an internal combustion engine that uses general fuel, such as gasoline or diesel fuel, to output power, and driving thereof is controlled by the engine ECU 24. Although not shown, the engine ECU 24 is configured as a microprocessor that has a CPU as a central component, and includes, in addition to the CPU, a ROM for storing a process program, a RAM for temporarily storing data, input and output ports, and a communication port. The engine ECU 24 receives signals from various sensors for detecting an operation state of the engine 22 via the input port, the signals including, for example: a crank position θcr from a crank position sensor that detects a rotation position of a crankshaft 26; a coolant temperature Twe from a coolant temperature sensor that detects a temperature of a coolant for the engine 22; a cam position θca from a cam position sensor that detects a rotation position of a camshaft for opening/closing an intake valve and an exhaust valve; a throttle position TP from a throttle valve position sensor that detects a position of a throttle valve; an intake air amount Qa from an airflow meter that is attached to an intake pipe; an intake air temperature Ta from a temperature sensor that is also attached to the intake pipe; and the like. The engine ECU 24 outputs various control signals for driving the engine 22 via the output port, the signals including, for example: a drive signal for a fuel injection valve; a drive signal for a throttle motor that regulates the position of the throttle valve; a control signal for an ignition coil that is integrated with an igniter; a control signal for a VVT 23; and the like. In addition, the engine ECU 24 communicates with the HVECU 70, controls an operation of the engine 22 by using a control signal from the HVECU 70, and outputs data on the operation state of the engine 22 to the HVECU 70 when necessary. Noted that the engine ECU 24 also computes a rotational speed of the crankshaft 26, that is, a speed Ne of the engine 22 based on the signal from the unillustrated crank position sensor that is attached to the crankshaft 26.

The planetary gear 30 is configured as a planetary gear mechanism of a single pinion type. A rotor of the motor MG1, a drive shaft 36 that is coupled to drive wheels 38$a$, 38$b$ via a differential gear 37, and the crankshaft 26 of the engine 22 are respectively connected to a sun gear, a ring gear, and a carrier of the planetary gear 30.

The motor MG1 is configured as a well-known synchronous generator motor that includes: the rotor in which a permanent magnet is embedded; and a stator around which a three-phase coil is wound. As described above, the rotor is connected to the sun gear of the planetary gear 30. Similar to the motor MG1, the motor MG2 is configured as the synchronous generator motor, and a rotor thereof is connected to the drive shaft 36. The motors MG1, MG2 are driven by controlling the inverters 41, 42 by the motor ECU 40. The inverters 41, 42 are connected to the boosting converter 56 by a power line (hereinafter referred to as a drive-voltage system power line) 54$a$. The boosting converter 56 is connected to a power line (hereinafter referred to as a battery-voltage system power line) 54$b$, to which the battery 50 and a system main relay 55 are connected. Although not shown, the inverters 41, 42 are configured as well-known inverters, each of which includes six transistors and six diodes.

Although not shown, the boosting converter 56 is configured as a well-known DC/DC converter that includes two transistors, two diodes, and a reactor. The boosting converter 56 can boost electric power in the battery-voltage system power line 54$b$ to supply the boosted electric power to the drive-voltage system power line 54$a$, and can lower a voltage of electric power in the drive-voltage system power line 54$a$ to supply the lowered electric power to the battery-voltage system power line 54$b$. A smoothing capacitor 57 for smoothing and a discharge resistor 59 for discharging are connected in parallel to the drive-voltage system power line 54$a$. In addition, the system main relay 55 is attached to a portion of the battery-voltage system power line 54$b$ on an output terminal side of the battery 50. Furthermore, a filter capacitor 58 for smoothing is connected to a portion of the battery-voltage system power line 54$b$ on the boosting converter 56 side.

Although not shown, the motor ECU 40 is configured as a microprocessor that has a CPU as a central component, and includes, in addition to the CPU, a ROM for storing a process program, a RAM for temporarily storing data, input/output ports, and a communication port. The motor ECU 40 receives signals that are required to control driving of the motors MG1, MG2 via the input port. The following can be raised as the signals received via the input port: rotation positions θm1, θm2 from rotation position detection sensors 43, 44 that respectively detect rotation positions of the rotors of the motors MG1, MG2; a motor temperature Tmg from each of temperature sensors 45, 46 that are respectively attached to the motors MG1, MG2; phase current that is applied to the motors MG1, MG2 and is detected by a current sensor, which is not shown; a voltage (a voltage of the drive-voltage system power line 54$a$, hereinafter referred to as a drive-voltage system voltage) VH of the smoothing capacitor 57 from a voltage sensor that is attached between terminals of the smoothing capacitor 57 and is not shown; a voltage (a voltage of the battery-voltage system power line 54$b$, hereinafter referred to as a battery-voltage system voltage) VL of the filter capacitor 58 from a voltage sensor that is attached between terminals of the filter capacitor 58 and is not shown; and element temperatures Ts1, Ts2 of the transistors, diodes, and the like from temperature sensors 41$a$, 42$a$ that are respectively attached to the inverters 41, 42. The motor ECU 40 outputs a switching control signal to each of the inverters 41, 42, a switching control signal to the boosting converter 56, and the like via the output port. In addition, the motor ECU 40 communicates with the HVECU 70, controls the driving of the motors MG1, MG2 by using a control signal from the HVECU 70, and outputs data on operation states of the motors MG1, MG2 to the HVECU 70 when necessary. Noted that the motor ECU 40 also computes rotational speeds Nm1, Nm2 of the motors MG1, MG2 based on the rotation positions θm1, θm2 of the rotors of the motors MG1, MG2 from the rotation position detection sensors 43, 44.

In the embodiment, mainly the inverters 41, 42, the boosting converter 56, and the motor ECU 24 are accommodated in the same housing, and these constitute a power control unit (hereinafter referred to as a PCU) 48.

The battery 50 is configured as a lithium-ion secondary battery, for example, and receives/transmits electric power from/to the motors MG1, MG2 via the inverters 41, 42. Although not shown, the battery ECU 52 for managing the battery 50 is configured as a microprocessor that has a CPU as a central component, and includes, in addition to the CPU, a ROM for storing a process program, a RAM for temporarily storing data, input/output ports, and a communication port. The battery ECU 52 receives signals that are required to manage the battery 50 via the input port, and transmits data on a state of the battery 50 to the HVECU 70 via the communication port when necessary. As the signals received via the input port, for example, an inter-terminal voltage Vb from a voltage sensor that is installed between terminals of the battery 50 and is not shown, a charged/discharged current Ib from a current sensor that is attached to the power line connected to the output terminal of the battery 50 and is not shown, a battery temperature Tb from a temperature sensor that is attached to the battery 50 and is not shown, and the like can be raised. In addition, in order to manage the battery 50, the battery ECU 52 computes a state of charge SOC that is a ratio of capacity of the electric power that can be discharged from the battery 50 at the time to full capacity of the battery 50 based on an integrated value of the charged/discharged current Ib that is detected by the current sensor, and computes input/output limits Win, Wout as maximum permissible electric power that may be charged/discharged to/from the battery 50 based on the computed state of charge SOC and the battery temperature Tb.

The HV unit cooler 60 includes: a radiator 62 for exchanging heat between the coolant LLC (a long-life coolant) and external air; a circulation flow passage 64 for circulating the coolant through the radiator 62, the PCU 48, the motors MG1, MG2 in this order; and an electric pump 66 for pressure-feeding the coolant. The radiator 62 is arranged in a forefront portion of an engine room, which is not shown. In the PCU 48, a coolant passage is arranged in the inverters 41, 42 and the boosting converter 56 and thereby cools these components.

Although not shown, the HVECU 70 is configured as a microprocessor that has a CPU as a central component, and includes, in addition to the CPU, a ROM for storing a process program, a RAM for temporarily storing data, input/output ports, and a communication port. The HVECU 70 receives various control signals via the input port. The following can be raised as the signals received via the input port: a pump rotational speed Np from a rotational speed sensor 66a that detects a rotational speed of the electric pump 66 in the HV unit cooler 60; an HV unit coolant temperature Thv from a temperature sensor 69 that detects the temperature of the coolant in the HV unit cooler 60; an ignition signal from an ignition switch 80; a shift position SP from a shift position sensor 82 that detects an operation position of a shift lever 81; an accelerator pedal operation amount Acc from an accelerator pedal position sensor 84 that detects a depression amount of an accelerator pedal 83; a brake pedal position BP from a brake pedal position sensor 86 that detects a depression amount of a brake pedal 85; and a vehicle speed V from a vehicle speed sensor 88. In addition, the HVECU 70 outputs a drive signal for the system main relay 55, a drive signal for a control signal transmitted to the electric pump 66 in the HV unit cooler 60, and the like via the output port. As described above, the HVECU 70 is connected to the engine ECU 24, the motor ECU 40, and the battery ECU 52 via the communication ports, and exchanges the various control signals and data with the engine ECU 24, the motor ECU 40, and the battery ECU 52, The hybrid vehicle 20 of the embodiment that is configured as described above calculates requested torque that should be output to the drive shaft 36 based on the accelerator pedal operation amount Acc that corresponds to the depression amount of the accelerator pedal 83 by a driver and the vehicle speed V. Then, the operations of the engine 22, the motor MG1, and the motor MG2 are controlled such that requested power corresponding to this requested torque is output to the drive shaft 36. As operation control of the engine 22, the motor MG1, and the motor MG2, following (1) to (3) are provided: (1) a torque conversion operation mode: an operation mode in which the operation of the engine 22 is controlled such that power that meets the requested power is output from the engine 22 and driving of the motor MG1 and driving of the motor MG2 are controlled such that the entire power output from the engine 22 is subjected to torque conversion by the planetary gear 30, the motor MG1, and the motor MG2 and is output to the drive shaft 36; (2) a charging/discharging operation mode: an operation mode in which the operation of the engine 22 is controlled such that power that meets a sum of the requested power and the electric power required for charging/discharging of the battery 50 is output from the engine 22 and driving of the motor MG1 and driving of the motor MG2 are controlled such that all or some of the power that is output from the engine 22 in conjunction with charging/discharging of the battery 50 is subjected to the torque conversion by planetary gear 30, the motor MG1, and the motor MG2 and thereby the requested power is output to the drive shaft 36; and (3) a motor operation mode: an operation mode in which the operation of the engine 22 is controlled such that the operation of the engine 22 is stopped and power from the motor MG2 that meets the requested power is output to the drive shaft 36.

Next, an operation of the hybrid vehicle 20 of the embodiment that is configured as described above, in particular, the operation thereof during a limp home travel at a time when abnormality occurs to the HV unit cooler 60 will be described. FIG. 2 is a flowchart that illustrates one example of limp home travel control in cooling system abnormality that is executed by the HVECU 70. This routine is repeatedly executed at specified intervals (for example, every 100 msec or the like).

Once the limp home travel control in the cooling system abnormality is executed, the HVECU 70 first executes a process of inputting data, such as the state of charge SOC of the battery 50 and the element temperatures Ts1, Ts2 of the inverters 41, 42 (step S100). Here, regarding the state of charge SOC of the battery 50, the state of charge SOC that is computed by the battery ECU 52 is received and can thereby be input. In addition, regarding the element temperatures Ts1, Ts2 of the inverters 41, 42, the element temperatures Ts1, Ts2 that are detected by the temperature sensors 41a, 42a are received from the motor ECU 40 and can thereby be input.

Next, a first temperature difference $\Delta Ts1$ and a second temperature difference $\Delta Ts2$ are calculated by respectively subtracting the input element temperatures Ts1, Ts2 from a first load rate limit temperature Tset1 and a second load rate limit temperature Tset2 that are defined in advance (step S110). Here, the first load rate limit temperature Tset1 is the element temperature of the inverter 41 that places a limitation on a load rate of the motor MG1, and a temperature that places a limitation of 20% on the load rate, a temperature that places a limitation of 50% on the load rate, a temperature that places a limitation of 80% on the load rate, or the like can be used, for example. Here, the second load rate limit temperature Tset2 is the element temperature of the inverter 42 that places a limitation on a load rate of the motor MG2, and a temperature that places a limitation of 5% on the load rate, a temperature that places a limitation of 20% on the load rate, a temperature that places a limitation of 50% on the load rate, a temperature that places a limitation of 80% on the load rate, or the like can be used, for example.

Figure 4:
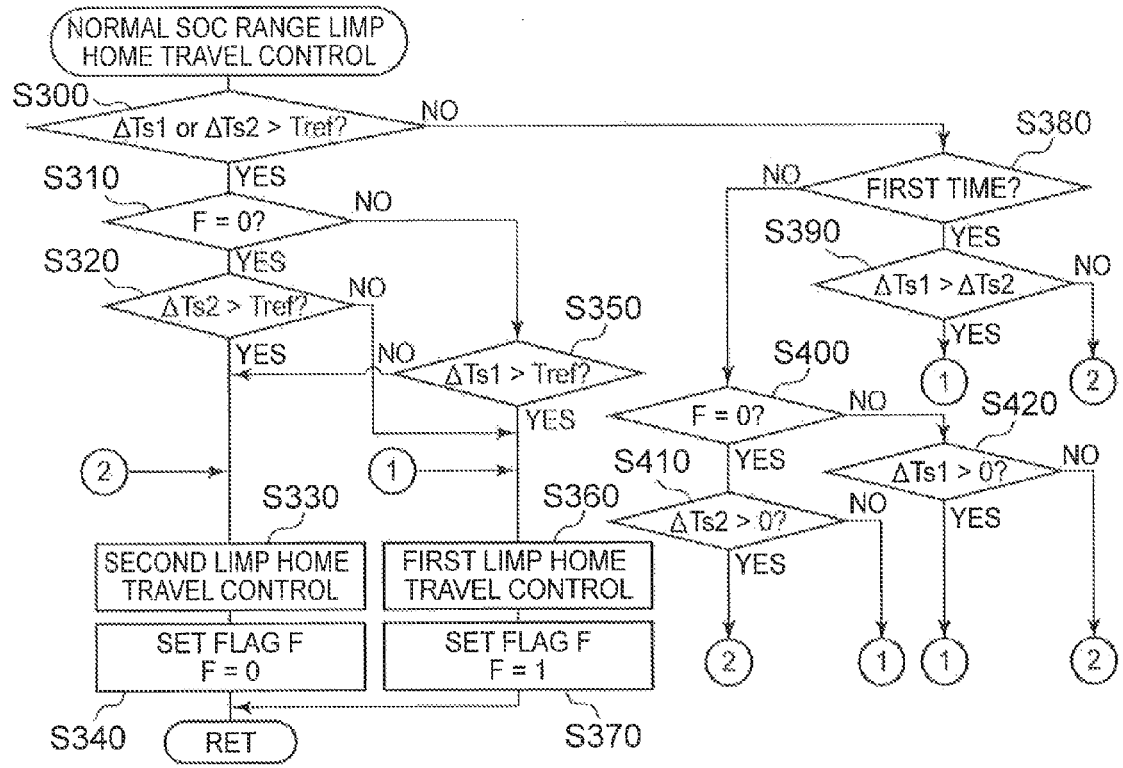
FIG. 4 is a flowchart that illustrates one example of normal SOC range limp home travel control.
Figure 5:
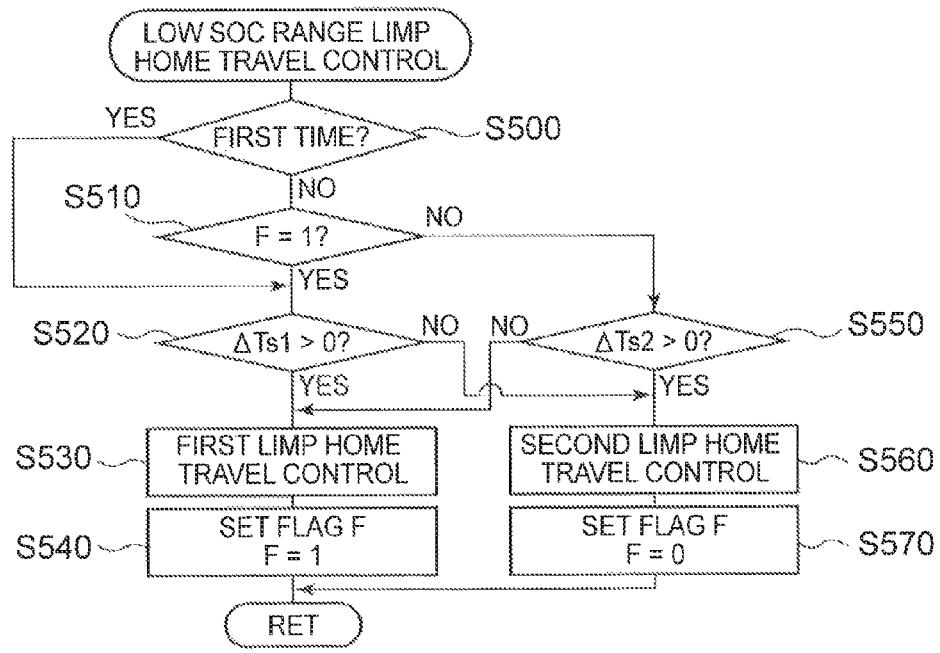
FIG. 5 is a flowchart that illustrates one example of low SOC range limp home travel control.

Next, it is determined whether the state of charge SOC of the battery 50 is within a control target range from a threshold S1 to a threshold S2 during a normal time in which the abnormality does not occur (hereinafter referred to as a "normal control range") (step S120). The normal control range is a range of a target value of the state of charge that is set for suitable use of the battery 50 when abnormality does not occur to the cooler and the like and all of the equipment are operated normally. Here, as the threshold S1 as a lower limit value of the normal control range, for example, 30%, 40%, 50%, or the like can be used. In addition, as the threshold S2 as an upper limit value of the normal control range, a value that is larger than the threshold S1 for example, 50%, 60%, 70%, or the like can be used. If the state of charge SOC of the battery 50 is larger than the upper limit value of the normal control range, high SOC range limp home travel control is executed by using the first temperature difference $\Delta Ts1$ and the second temperature difference $\Delta Ts2$ that are calculated in step S110 (step S130), and this control is terminated. If the state of charge SOC of the battery 50 is within the normal control range, normal SOC range limp home travel control is executed by using the first temperature difference $\Delta Ts1$ and the second temperature difference $\Delta Ts2$ in a similar manner (step S140), and this control is terminated. If the state of charge SOC of the battery 50 is smaller than the lower limit value of the normal control range, low SOC range limp home travel control is executed by using the first temperature difference ΔTs1 and the second temperature difference ΔTs2 in the similar manner (step S150), and this control is terminated. One example of the high SOC range limp home travel control is shown in FIG. 3, one example of the normal SOC range limp home travel control is shown in FIG. 4, and the low SOC range limp home travel control is shown in FIG. 5. Hereinafter, the high SOC range limp home travel control, the normal SOC range limp home travel control, and the low SOC range limp home travel control will be described sequentially. Prior to the description of these, first limp home travel control and second limp home travel control that are used in each of the control will be described.

Figure 6:
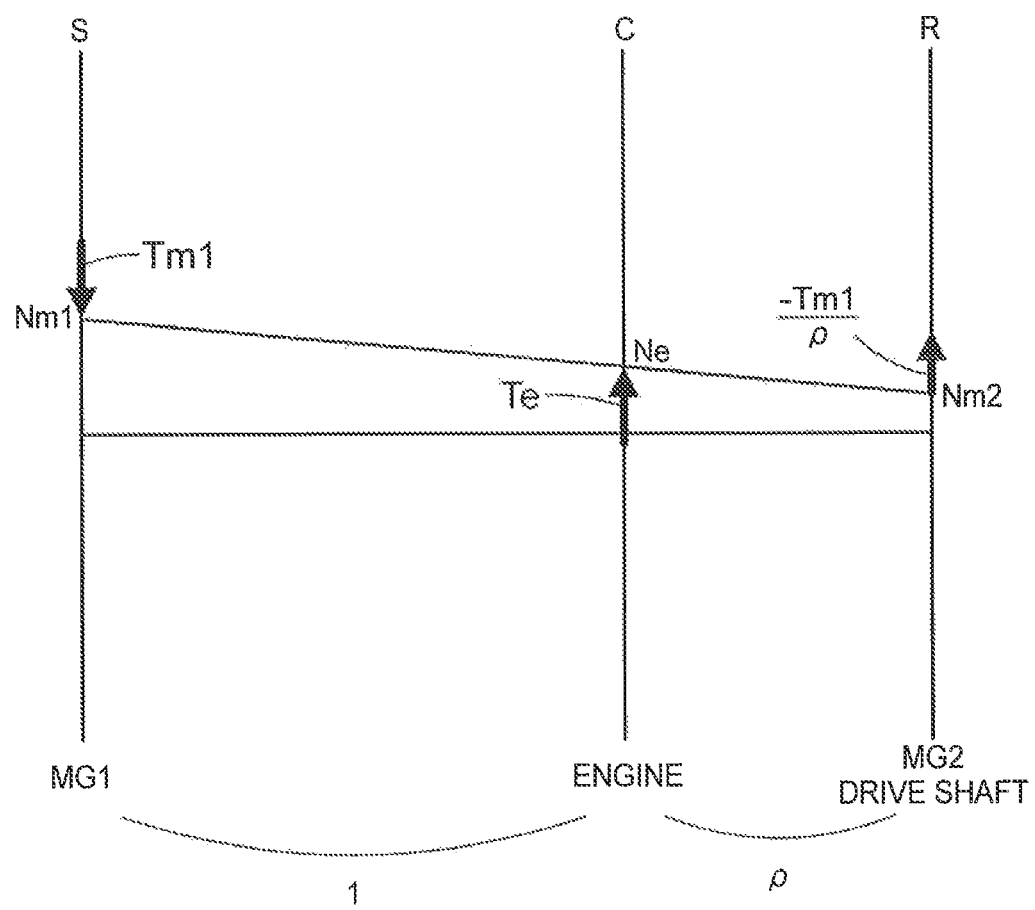
FIG. 6 is an explanatory view that illustrates one example of a collinear diagram in a state where first limp home travel control is executed.
Figure 7:
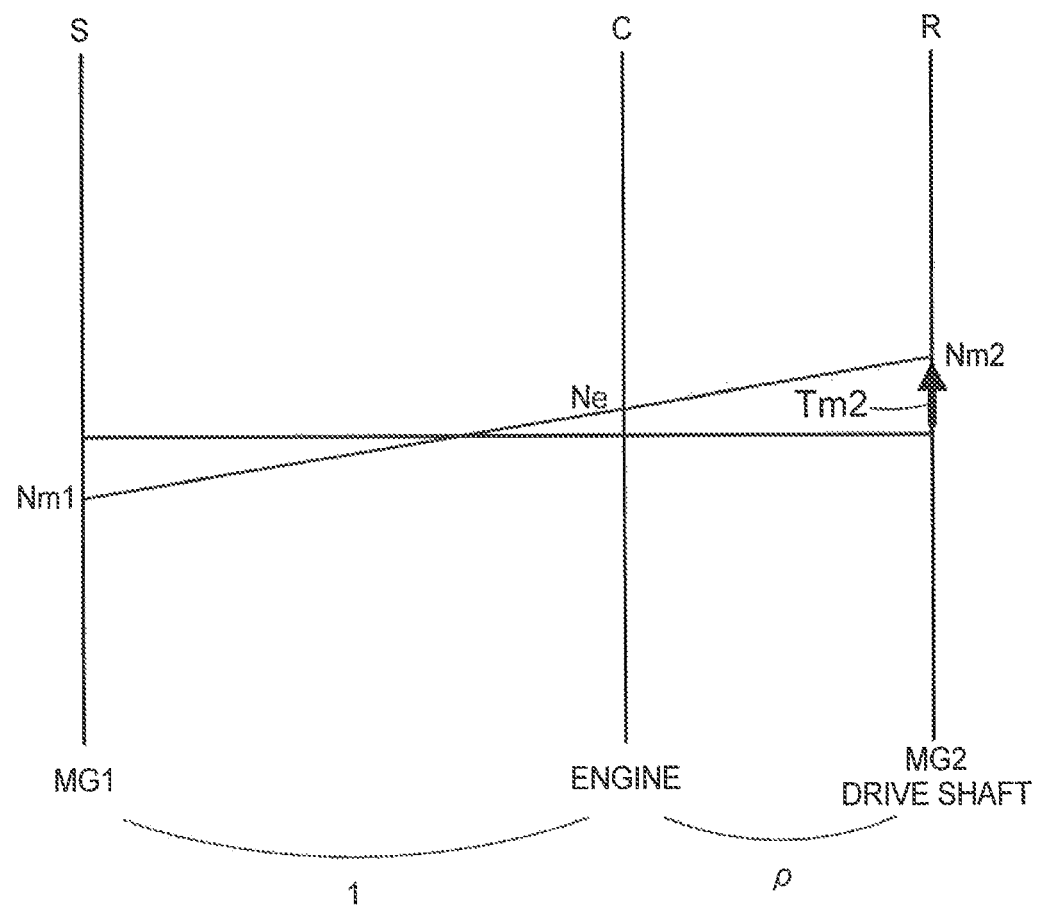
FIG. 7 is an explanatory view that illustrates one example of a collinear diagram in a state where second limp home travel control is executed.

The first limp home travel control is a control in which the engine 22, the motor MG1, and the motor MG2 are controlled such that the power from the motor MG2 is not used and the vehicle travels by using the power from the engine 22 and the motor MG1. The second limp home travel control is a control in which the engine 22, the motor MG1, and the motor MG2 are controlled such that the power from the engine 22 and the motor MG1 are not used and the vehicle travels by using the power from the motor MG2. FIG. 6 shows a collinear diagram in a state where the first limp home travel control is executed, and FIG. 7 shows a collinear diagram in a state where the second limp home travel control is executed. In each of the diagrams, an S-axis on the left indicates a rotational speed of the sun gear as the rotational speed Nm1 of the motor MG1, a C-axis indicates a rotational speed of the carrier as the speed Ne of the engine 22, and an R-axis indicates a rotational speed Nr of the ring gear (the drive shaft 36) as the rotational speed Nm2 of the motor MG2. In addition, in each of the diagrams, a bold arrow on the R-axis indicates torque that is output from the motor MG1 and acts on the drive shaft 36 via the planetary gear 30 and torque that is output from the motor MG2 and acts on the drive shaft 36. "ρ" is a gear ratio (the number of teeth of the sun gear/the number of teeth of the ring gear) of the planetary gear 30. In the first limp home travel control, as shown in FIG. 6, torque Te from the engine 22 is received by torque Tm1 of the motor MG1. Accordingly, torque (−Tm1/ρ) as a reaction force is output to the drive shaft 36, and thus the vehicle travels by using the torque as this reaction force. In the first limp home travel control the motor MG1 functions as a generator. Thus, the vehicle travels in conjunction with charging of the battery 50. In the embodiment, the inverter 42 is shut down in the first limp home travel control. The inverter 42 can be controlled such that a value it of the torque is output from the motor MG2. However, in this case, the current flows through the transistor and increases the temperature of the element. A reason why the inverter 42 is shut down is to suppress a temperature increase of the element of the inverter 42. In the second limp home travel control, as shown in FIG. 7, the vehicle travels by using torque Tm2 from the motor MG2. Thus, the vehicle travels in conjunction with discharging of the battery 50. In the embodiment, the inverter 41 is shut down in the second limp home travel control. The inverter 41 can be controlled such that a value 0 of the torque is output from the motor MG1. However, in this case, the current flows through the transistor and increases the temperature of the element. A reason why the inverter 41 is shut down is to suppress a temperature increase of the element of the inverter 41. Noted that, the engine 22 performs a self-sustaining operation (an idling operation) at an idling speed. Here, in the hybrid vehicle 20 of this embodiment, as the limp home travel control, in addition to the first limp home travel control and the second limp home travel control, normal limp home travel control in which the vehicle travels by using the power from the engine 22, the motor MG1, and the motor MG2 in the torque conversion operation mode or the charging/discharging operation mode is executed. In this normal limp home travel control, the motor MG1 and the motor MG2 are driven. Thus, when the abnormality occurs to the HV unit cooler 60, the element temperatures of the inverters 41, 42 are increased at an early stage.

A description will be made on the high SOC range limp home travel control shown in FIG. 3. In the high SOC range limp home travel control, a value of a flag F is first checked (step S200). Here, the flag F is a flag, an initial value of which is 0, for which a value 1 is set at a time when the first limp home travel control is executed, and for which a value 0 is set at a time when the second limp home travel control is executed. If the flag F has the value 0, it is determined whether the second temperature difference ΔTs2 is larger than the value 0 (step S210). If it is determined that the second temperature difference ΔTs2 is larger than the value 0, the second limp home travel control is selected (step S220), the value 0 is set for the flag F (step S230), and this control is terminated. When the second limp home travel control is selected, the HVECU 70 executes the second limp home travel control based on the operation of the accelerator pedal 83 by the driver and the like. Here, a situation where the abnormality occurs to the HV unit cooler 60, the limp home travel control in the cooling system abnormality in FIG. 2 is executed for the first time, and it is determined that the state of charge SOC is larger than the upper limit value of the normal control range is considered. In this case, the flag F has the value 0 as the initial value. Thus, when the second temperature difference ΔTs2 is larger than the value 0, the second limp home travel control is selected. The second temperature difference ΔTs2 is obtained by subtracting the element temperature Ts2 of the inverter 42 from the second load rate limit temperature Tset2. Accordingly, when the abnormality occurs to the HV unit cooler 60, the second temperature difference ΔTs2 is usually larger than the value 0. Thus, when the abnormality occurs to the HV unit cooler 60 in a state where the state of charge SOC is larger than the upper limit value of the normal control range, the second limp home travel control is preferentially selected. This is based on a fact that the vehicle travels in conjunction with discharging of the battery 50 in the second limp home travel control. On the other hand, the vehicle travels in conjunction with charging of the battery 50 in the first limp home travel control. Thus, if the first limp home travel control is preferentially selected, the state of charge SOC is further increased, and the battery 50 is possibly overcharged. Therefore, overcharging of the battery 50 can be suppressed by preferentially selecting the second limp home travel control. In this way, the high SOC range limp home travel control is terminated. Then, in a case where the limp home travel control in the cooling system abnormality in FIG. 2 is executed again and it is determined that the state of charge SOC is larger than the upper limit value of the normal control range, the high SOC range limp home travel control is executed again. The value 0 is set for the flag F at this time. Thus, when the second temperature difference ΔTs2 is larger than the value 0, the second limp home travel control is selected. That is, in the state where the state of charge SOC is larger than the upper limit value of the normal control range, the second limp home travel control is continuously executed until the second temperature difference $\Delta Ts2$ reaches the value 0.

If the second temperature difference $\Delta Ts2$ reaches the value 0 in the state where the state of charge SOC is larger than the upper limit value of the normal control range, a negative determination is made in step S210. In this case, the first limp home travel control is selected (step S250), the value 1 is set for the flag F (step S260), and this control is terminated. That is, the second limp home travel control is switched to the first limp home travel control. When the first limp home travel control is selected, the HVECU 70 executes the first limp home travel control based on the operation of the accelerator pedal 83 by the driver and the like. If the high SOC range limp home travel control is executed again in this state, the flag F has the value 1, and thus a negative determination is made in step S200. Then, it is determined whether the first temperature difference $\Delta Ts1$ is larger than the value 0 (step S240). The inverter 41 is shut down while the second limp home travel control is continuously executed. Accordingly, the element temperature Ts1 of the inverter 41 becomes lower than the first load rate limit temperature Tset1. Thus, the first temperature difference $\Delta Ts1$ as the difference therebetween becomes larger than the value 0. As a result, a positive determination is made in step S240, and the first limp home travel control is selected. That is, when the first limp home travel control is selected, in the state where the state of charge SOC is larger than the upper limit value of the normal control range, the first limp home travel control is continuously executed until the first temperature difference $\Delta Ts1$ reaches the value 0.

Then, in a case where the first temperature difference $\Delta Ts1$ reaches the value 0 while the first limp home travel control is continuously executed, a negative determination is made in step S240, the second limp home travel control is selected (step S220), the value 0 is set for the flag F (step S230), and this control is terminated. That is, the first limp home travel control is switched to the second limp home travel control. At this time, the inverter 42 is shut down while the first limp home travel control is continuously executed. Accordingly, the element of the inverter 42 is cooled to some extent, and the second temperature difference $\Delta Ts2$ becomes larger than the value 0, Thus, the second limp home travel control is continuously selected until the second temperature difference $\Delta Ts2$ reaches the value 0. From what have been described so far, in the state where the state of charge SOC is larger than the upper limit value of the normal control range, the second limp home travel control is selected first. Then, the limp home travel is made while the second limp home travel control that is executed until the second temperature difference $\Delta Ts2$ reaches the value 0 and the first limp home travel control that is executed until the first temperature difference $\Delta Ts1$ reaches the value 0 are alternated. The element of the inverter 42 is cooled to some extent when the first limp home travel control is executed. The element of the inverter 41 is cooled to some extent when the second limp home travel control is executed. Thus, a limp home travel distance can further be extended by alternately executing the first limp home travel control and the second limp home travel control.

Next, a description will be made on the normal SOC range limp home travel control shown in FIG. 4. In the normal SOC range limp home travel control, it is first determined whether the first temperature difference $\Delta Ts1$ and the second temperature difference $\Delta Ts2$ are larger than a threshold Tref (step S300). Here, the threshold Tref is set as a threshold that allows the element temperatures Ts1, Ts2 of the inverters 41, 42 to have certain margins with respect to the first load rate limit temperature Tset1 and the second load rate limit temperature Tset2. For example, 10° C., 15° C., 20° C., 25° C. or the like can be used. If at least one of the first temperature difference $\Delta Ts1$ and the second temperature difference $\Delta Ts2$ is larger than the threshold Tref, the value of the flag F is checked (step S310). If the flag has the value 0, it is determined whether the second temperature difference $\Delta Ts2$ is larger than the threshold Tref (step S320). If the flag F has the value 1, it is determined whether the first temperature difference $\Delta Ts1$ is larger than the threshold Tref (step S350). Here, consideration is given to a situation where the abnormality occurs to the HV unit cooler 60, where the limp home travel control in the cooling system abnormality in FIG. 2 is executed for the first time, where it is determined that the state of charge SOC is within the normal control range, and where both of the first temperature difference $\Delta Ts1$ and the second temperature difference $\Delta Ts2$ are larger than the threshold Tref. In this case, because the value 0 is set as the initial value for the flag F, a negative determination is made in step S310. Accordingly, it is determined in step S320 that the second temperature difference $\Delta Ts2$ is larger than the threshold Tref. Thus, the second limp home travel control is selected (step S330), the value 0 is set for the flag F (step S340), and this control is terminated. In a case where the limp home travel control in the cooling system abnormality in FIG. 2 is executed again and it is determined that the state of charge SOC is within the normal control range, the normal SOC range limp home travel control is executed again. At this time, it is determined that the flag F has the value 0. If the second temperature difference $\Delta Ts2$ is larger than the threshold Tref, the second limp home travel control is selected. That is, in a state where the state of charge SOC is within the normal control range, first, the second limp home travel control is continuously executed until the second temperature difference $\Delta Ts2$ reaches the threshold Tref.

In a case where the second temperature difference $\Delta Ts2$ reaches the threshold Tref while the second limp home travel control is continuously executed as described above, a negative determination is made in step S320. Then, the first limp home travel control is selected (step S360), the value 1 is set for the flag F (step S370), and this control is terminated. That is, the second limp home travel control is switched to the first limp home travel control. The situation where both of the first temperature difference $\Delta Ts1$ and the second temperature difference $\Delta Ts2$ are larger than the threshold Tref is currently considered. Accordingly, if the normal SOC range limp home travel control is executed again in this state, the first temperature difference $\Delta Ts1$ is larger than the threshold Tref, and thus a positive determination is made in step S300. Then, a negative determination is made in step S310 by setting the value 1 for the flag F. Thus, the first limp home travel control is selected again in step S360. That is, if the first limp home travel control is selected, in the state where the state of charge SOC is within the normal control range, the first limp home travel control is continuously executed until the first temperature difference $\Delta Ts1$ reaches the threshold Tref.

Then, in a case where the first temperature difference $\Delta Ts1$ reaches the threshold Tref while the first limp home travel control is continuously executed, a negative determination is made in step S350, the second limp home travel control is selected (step S330), the value 0 is set for the flag F (step S340), and this control is terminated. That is, the first limp home travel control is switched to the second limp home travel control. At this time, the element of the inverter 42 is cooled to some extent while the first limp home travel control is continuously executed. Accordingly, the second temperature difference ΔTs2 becomes larger than the threshold Tref. Thus, the second limp home travel control is continuously selected until the second temperature difference ΔTs2 reaches the threshold Tref From these steps, in a case where at least one of the first temperature difference ΔTs1 and the second temperature difference ΔTs2 is larger than the threshold. Tref in the state where the state of charge SOC is within the normal control range, first, the second limp home travel control is selected. Then, the limp home travel is made while the second limp home travel control that is executed until the second temperature difference ΔTs2 reaches the threshold Tref and the first limp home travel control that is executed until the first temperature difference ΔTs1 reaches the threshold Tref are alternated. The element of the inverter 42 is cooled to some extent when the first limp home travel control is executed. The element of the inverter 41 is cooled to some extent when the second limp home travel control is executed. Thus, the limp home travel distance can further be extended by alternately executing the first limp home travel control and the second limp home travel control.

On the other hand, if it is determined in step S300 that both of the first temperature difference ΔTs1 and the second temperature difference ΔTs2 are at most equal to the threshold Tref, it is determined whether this determination (the determination that both of the first temperature difference ΔTs1 and the second temperature difference ΔTs2 are at most equal to the threshold Tref) is made for the first time (step S380). If it is determined as the first time, it is determined whether the first temperature difference ΔTs1 is larger than the second temperature difference ΔTs2 (step S390). If the first temperature difference ΔTs1 is larger than the second temperature difference ΔTs2, the first limp home travel control is selected (step S360), the value 1 is set for the flag F (step S374 and this control is terminated. If the first temperature difference ΔTs1 is at most equal to the second temperature difference ΔTs2, the second limp home travel control is selected (step S330), the value 0 is set for the flag F (step S340), and this control is terminated. Then, in a case where the normal SOC range limp home travel control is executed again and it is determined that both of the first temperature difference ΔTs1 and the second temperature difference ΔTs2 are at most equal to the threshold Tref in step S300, it is determined not as the first time in step S380. In this case, it is determined whether the flag F has the value 0 (step S400). In a case where the second limp home travel control is selected in the processes of steps S380, S390 and the value 0 is set for the flag F (steps S330, S340), a positive determination is made in step S400, and it is determined whether the second temperature difference ΔTs2 is larger than the value 0 (step S410). Then, if the second temperature difference ΔTs2 is larger than the value 0, the second limp home travel control is selected (step S330), the value 0 is set for the flag F (step S340), and this control is terminated. Accordingly, similar to the high SOC range limp home travel control, the second limp home travel control is continuously executed until the second temperature difference ΔTs2 reaches the value 0. In a case where the first limp home travel control is selected in the processes of steps S380, S390 and the value 1 is set for the flag F (steps S360, S370), the flag F has the value 1, and thus a negative determination is made in step S400. Then, it is determined whether the first temperature difference ΔTs1 is larger than the value 0 (step S420). Then, if the first temperature difference ΔTs1 is larger than the value 0, the first limp home travel control is selected (step S360), the value 1 is set for the flag F (step S370), and this control is terminated. Accordingly, similar to the high SOC range limp home travel control, the first limp home travel control is continuously executed until the first temperature difference ΔTs1 reaches the value 0.

From what have been described so far, the first limp home travel control is selected in a case where it is determined in step S300 that both of the first temperature difference ΔTs1 and the second temperature difference ΔTs2 are at most equal to the threshold Tref and where the first temperature difference ΔTs1 is larger than the second temperature difference ΔTs2. If the first temperature difference ΔTs1 is at most equal to the second temperature difference ΔTs2, the second limp home travel control is selected. Then, the limp home travel is made by executing the initially selected limp home travel control and then alternating the first limp home travel control that is executed until the first temperature difference ΔTs1 reaches the value 0 and the second limp home travel control that is executed until the second temperature difference ΔTs2 reaches the value 0. The element of the inverter 42 is cooled to some extent when the first limp home travel control is executed. The element of the inverter 41 is cooled to some extent when the second limp home travel control is executed. Thus, the limp home travel distance can further be extended by alternately executing the first limp home travel control and the second limp home travel control.

Next, a description will be made on the low SOC range limp home travel control shown in FIG. 5. In the low SOC range limp home travel control, it is first determined whether this control is executed for the first time (step S500). If the low SOC range limp home travel control is executed for the first time, it is determined whether the first temperature difference ΔTs1 is larger than the value 0 (step S520). If it is the first time, the first temperature difference ΔTs1 is usually larger than the value 0. Thus, a positive determination is made in step S520. Then, the first limp home travel control is selected (step S530), the value 1 is set for the flag F (step S540), and this control is terminated. When the low SOC range limp home travel control is executed again, a negative determination is made in step S500. Thus, it is determined whether the flag F has the value 1 (step S510). The first limp home travel control is selected, and the value 1 is set for the flag F. Thus, a positive determination is made in step S510. Then, it is determined whether the first temperature difference ΔTs1 is larger than the value 0 (step S520). If the first temperature difference ΔTs1 is larger than the value 0, the first limp home travel control is selected (step S530), the value 1 is set for the flag F (step S540), and this control is terminated. Accordingly, in the low SOC range limp home travel control, the first limp home travel control is selected first, and the first limp home travel control is continuously executed until the first temperature difference ΔTs1 reaches the value 0. That is, the first limp home travel control is preferentially selected. This is based on the fact that the vehicle travels in conjunction with charging of the battery 50 in the first limp home travel control. On the other hand, when the second limp home travel control is preferentially selected, the vehicle travels in conjunction with discharging of the battery 50 in the second limp home travel control. Thus, the state of charge SOC is further decreased, and the battery 50 is possibly overdischarged. Therefore, overdischarging of the battery 50 can be suppressed by preferentially selecting the first limp home travel control.

If the first temperature difference ΔTs1 reaches the value 0 in a state where the state of charge SOC is smaller than the lower limit value of the normal control range, a negative determination is made in step S520. In this case, the second limp home travel control is selected (step S560), the value 0 is set for the flag F (step S570), and this control is terminated. That is, the first limp home travel control is switched to the second limp home travel control. If the low SOC range limp home travel control is executed again in this state, the flag F has the value 0, and thus a negative determination is made in step S510. Then, it is determined whether the second temperature difference ΔTs2 is larger than the value 0 (step S550). The element of the inverter 42 is cooled to some extent while the first limp home travel control is continuously executed. Accordingly, the second temperature difference ΔTs2 becomes larger than the value 0. As a result, a positive determination is made in step S550, and the second limp home travel control is selected. That is, when the second limp home travel control is selected, in the state where the state of charge SOC is smaller than the lower limit value of the normal control range, the second limp home travel control is continuously executed until the second temperature difference ΔTs2 reaches the value 0.

In a case where the second temperature difference ΔTs2 reaches the value 0 while the second limp home travel control is continuously executed, a negative determination is made in step S550, the first limp home travel control is selected (step S530), the value 1 is set for the flag F (step S540), and this control is terminated. That is, the second limp home travel control is switched to the first limp home travel control. At this time, the element of the inverter 41 is cooled to some extent while the second limp home travel control is continuously executed. Accordingly, the first temperature difference ΔTs1 becomes larger than the value 0. Thus, the first limp home travel control is continuously selected until the first temperature difference ΔTs1 reaches the value 0. From what have been described so far, in the state where the state of charge SOC is smaller than the lower limit value of the normal control range, the first limp home travel control is selected first. Then, the limp home travel is made while the first limp home travel control that is executed until the first temperature difference ΔTs1 reaches the value 0 and the second limp home travel control that is executed until the second temperature difference ΔTs2 reaches the value 0 are alternated. The element of the inverter 42 is cooled to some extent when the first limp home travel control is executed. The element of the inverter 41 is cooled to some extent when the second limp home travel control is executed. Thus, the limp home travel distance can further be extended by alternately executing the first limp home travel control and the second limp home travel control.

In the hybrid vehicle 20 of the embodiment that has been described so far, in a case where the abnormality occurs to the HV unit cooler 60, the limp home travel is made by switching between the first limp home travel control and the second limp home travel control based on the state of charge SOC of the battery 50, the first temperature difference ΔTs1 that is obtained by subtracting the element temperature Ts1 of the inverter 41 from the first load rate limit temperature Tset1, and the second temperature difference ΔTs2 that is obtained by subtracting the element temperature Ts2 of the inverter 42 from the second load rate limit temperature Tset2. When the limp home travel is made by the first limp home travel control, the element temperature Ts1 the inverter 41 is increased; however, the element temperature Ts2 of the inverter 42 that is shut down is lowered to some extent. On the other hand, when the limp home travel is made by the second limp home travel control, the element temperature Ts2 of the inverter 42 is increased; however, the element temperature Ts1 of the inverter 41 that is shut down is lowered to some extent. Accordingly, in a case where the limp home travel is made by switching between the first limp home travel control and the second limp home travel control, such a situation can be suppressed where the temperatures of the element of the inverter 41 and the element of the inverter 42 are simultaneously increased, the load rate limit is applied to the motor MG1 and the motor MG2 in a relatively short time, and the limp home travel can no longer be made. Thus, the limp home travel distance can be extended. As a result, the limp home travel can further appropriately be made, In the hybrid vehicle 20 of the embodiment, in a case where the state of charge SOC of the battery 50 is larger than the upper limit value of the normal control range when the abnormality occurs to the HV unit cooler 60, the second limp home travel control, by which the limp home travel is made in conjunction with discharging of the battery 50, is preferentially selected. In this way, overcharging of the battery 50 can be suppressed. In addition, the limp home travel is made by alternating the second limp home travel control that is executed until the second temperature difference ΔTs2 reaches the value 0 and the first limp home travel control that is executed until the first temperature difference ΔTs1 reaches the value 0. Thus, the limp home travel distance can further be extended.

In the hybrid vehicle 20 of the embodiment, in a case where the state of charge SOC of the battery 50 is within the normal control range When the abnormality occurs to the RV unit cooler 60 and where at least one of the first temperature difference ΔTs1 and the second temperature difference ΔTs2 is larger than the threshold Tref, the second limp home travel control is selected, and the limp home travel is made by alternating the second limp home travel control that is executed until the second temperature difference ΔTs2 reaches the threshold Tref and the first limp home travel control that is executed until the first temperature difference ΔTs1 reaches the threshold Tref. In this way, the limp home travel distance can further be extended in the state where the element temperatures Ts1, Ts2 of the inverters 41, 42 have the margins with respect to the first load, rate limit temperature Tset1 and the second load rate limit temperature Tset2. Furthermore, the first limp home travel control is selected in a case where both of the first temperature difference ΔTs1 and the second temperature difference ΔTs2 are at most equal to the threshold Tref and where the first temperature difference ΔTs1 is larger than the second temperature difference ΔTs2. In a case where the first temperature difference ΔTs1 is at most equal to the second temperature difference ΔTs2, the second limp home travel control is selected. Then, the limp home travel is made by executing the initially selected limp home travel control and then alternating the first limp home travel control that is executed until the first temperature difference ΔTs1 reaches the value 0 and the second limp home travel control that is executed until the second temperature difference ΔTs2 reaches the value 0. In this way, the limp home travel distance can further be extended by suppressing frequent switching of the limp home travel control.

In the hybrid vehicle 20 of the embodiment, in a case where the state of charge SOC of the battery 50 is smaller than the lower limit value of the normal control range when the abnormality occurs to the HV unit cooler 60, the first limp home travel control, by which the limp home travel is made in conjunction with charging of the battery 50, is preferentially selected. In this way, overdischarging of the battery 50 can be suppressed. In addition, the limp home travel is made by alternating the first limp home travel control that is executed until the first temperature difference ΔTs1 reaches the value 0 and the second limp home travel control that is executed until the second temperature difference ΔTs2 reaches the value 0. Thus, the limp home travel distance can further be extended.

Figure 8:
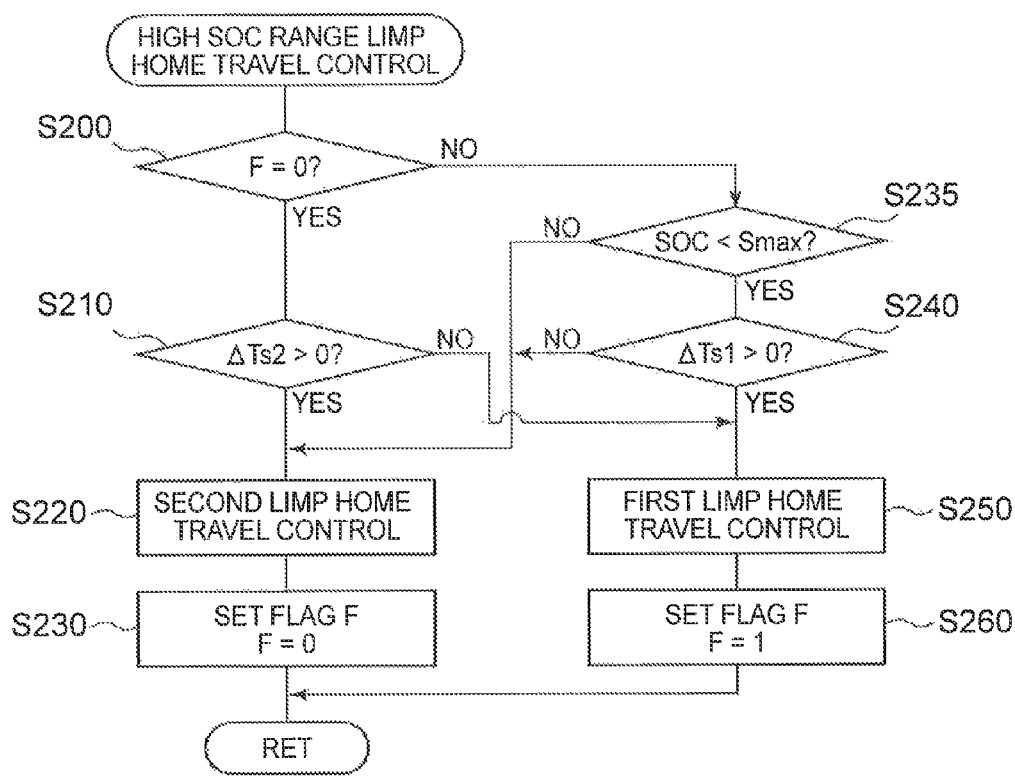
FIG. 8 is a flowchart that illustrates one example of high SOC range limp home travel control in a modified example.

In the hybrid vehicle 20 of the embodiment, the second limp home travel control is selected in a case where the state of charge SOC of the battery 50 is within the normal control range when the abnormality occurs to the HV unit cooler 60 and where at least one of the first temperature difference ΔTs1 and the second temperature difference ΔTs2 is larger than the threshold Tref. However, the first limp home travel control may be selected first.

in the hybrid vehicle 20 of the embodiment, in a case where the state of charge SOC of the battery 50 is larger than the upper limit value of the normal control range when the abnormality occurs to the HV unit cooler 60 and where the first limp home travel control is selected, the first limp home travel control is continuously selected until the first temperature difference ΔTs1 reaches the value 0. However, in a case where the state of charge SOC of the battery 50 reaches a permissible maximum value Smax, the first limp home travel control may be switched to the second limp home travel control even when the first temperature difference ΔTs1 does not reach the value 0. One example of the high SOC range limp home travel control in this case is shown in FIG. 8. Noted that the permissible maximum value Smax is a maximum state of charge at which the battery 50 can appropriately be used. By charging the battery 50 to this permissible maximum value Smax or smaller, significant deterioration of the battery 50 can be suppressed. After the first limp home travel control is selected, it is determined whether the state of charge SOC of the battery 50 is smaller than the permissible maximum value Smax (step S235)o If the state of charge SOC of the battery 50 is smaller than the permissible maximum value Smax, it is determined whether the first temperature difference ΔTs1 is larger than the value 0 (step S240) If it is determined that the first temperature difference ΔTs1 is larger than the value 0, the first limp home travel control is selected (step S250), the value 1 is set for the flag F (step S260), and this control is terminated. Thus, in a state where the state of charge SOC of the battery 50 is smaller than the permissible maximum value Smax, the first limp home travel control is continuously executed until the first temperature difference ΔTs1 reaches the value 0. On the other hand, if the state of charge SOC of the battery 50 reaches the permissible maximum value Smax before the first temperature difference ΔTs1 reaches the value 0, the second limp home travel control is selected (step S220), the value 0 is set for the flag (step S230), and this control is terminated. By executing such high SOC range limp home travel control of a modified example, it is possible to avoid the state of charge SOC of the battery 50 from exceeding the permissible maximum value Smax. As a result, overcharging of the battery 50 can be suppressed.

Figure 9:
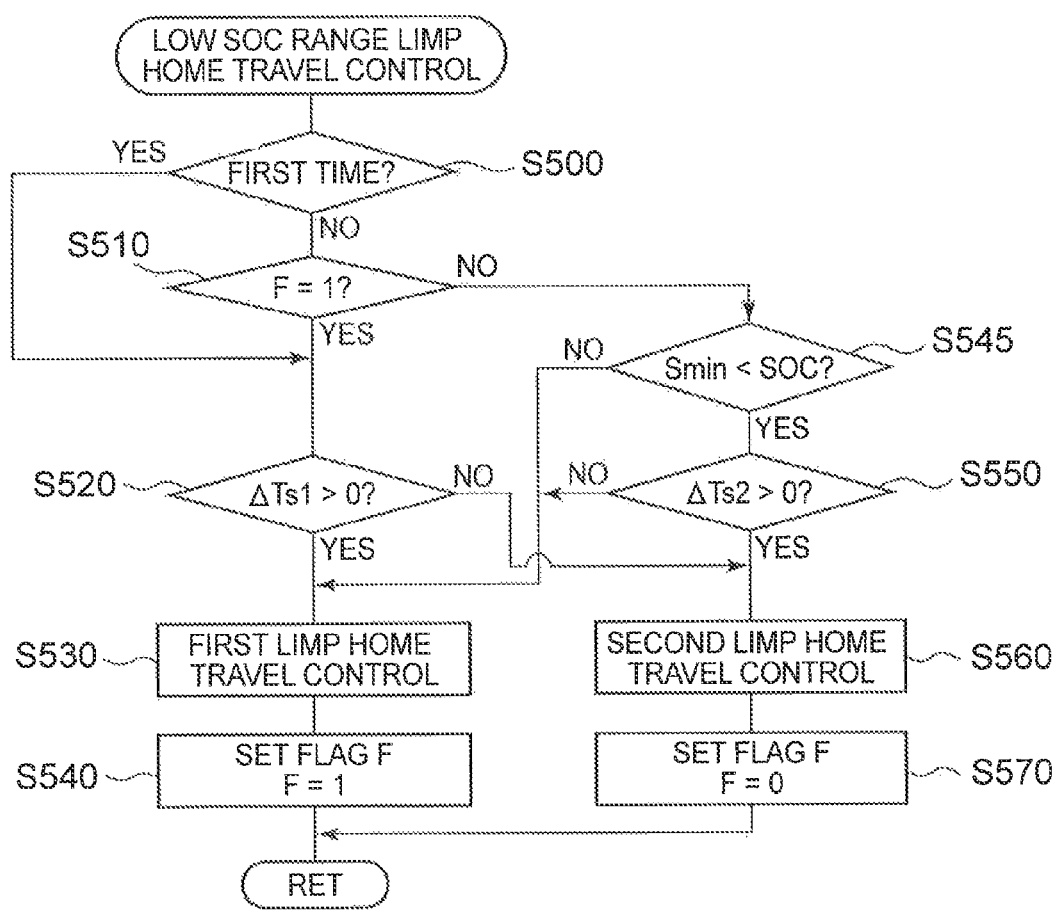
FIG. 9 is a flowchart that illustrates one example of low SOC range limp home travel control in the modified example.

In the hybrid vehicle 20 of the embodiment, in a case where the state of charge SOC of the battery 50 is smaller than the lower limit value of the normal control range when the abnormality occurs to the HV unit cooler 60 and where the second limp home travel control is selected, the second limp home travel control is continuously selected until the second temperature difference ΔTs2 reaches the value 0. However, in a case where the state of charge SOC of the battery 50 reaches a permissible minimum value Smin, the second limp home travel control may be switched to the first limp home travel control even when the second temperature difference ΔTs2 does not reach the value 0. One example of the low SOC range limp home travel control in this case is shown in FIG. 9. Noted that the permissible minimum value Smin is a minimum state of charge at which the battery 50 can appropriately be used. By charging the battery 50 to this permissible minimum value Smin or larger, the significant deterioration of the battery 50 can be suppressed. After the second limp home travel control is selected, it is determined whether the state of charge SOC of the battery 50 is larger than the permissible minimum value Smin (step S545). If the state of charge SOC of the battery 50 is larger than the permissible minimum value Smin, it is determined whether the second temperature difference ΔTs2 is larger than the value 0 (step S550). If it is determined that the second temperature difference ΔTs2 is larger than the value 0, the second limp home travel control is selected (step S560), the value 0 is set for the flag F (step 3570), and this control is terminated. Thus, in a state where the state of charge SOC of the battery 50 is smaller than the permissible minimum value Smin, the second limp home travel control is continuously executed until the second temperature difference ΔTs2 reaches the value 0. On the other hand, if the state of charge SOC of the battery 50 reaches the permissible minimum value Smin before the second temperature difference ΔTs2 reaches the value 0, a negative determination is made in step S545, the first limp home travel control is selected (step S530), the value 1 is set for the flag F (step S540), and this control is terminated. By executing such low SOC range limp home travel control of the modified example, it is possible to avoid the state of charge SOC of the battery 50 from falling below the permissible minimum value Smin. As a result, overdischarging of the battery 50 can be suppressed.

In the hybrid vehicle 20 of the embodiment, in a case where the first limp home travel control is executed when the abnormality occurs to the HV unit cooler 60, the inverter 42 is shut down. In a case where the second limp home travel control is executed when the abnormality occurs to the HV unit cooler 60, the inverter 41 is shut down. However, the inverter 42 may be controlled such that the torque of the motor MG2 obtains the value 0 by the inverter 42 during the execution of the first limp home travel control, and the inverter 41 may be controlled such that the torque of the motor MG1 obtains the value 0 by the inverter 41 during the execution of the second limp home travel control. Also, in this case, compared to a ease where the torque is output from both of the motor MG1 and the motor MG2, the increase in each of the element temperatures Ts1, Ts2 of the inverters 41, 42 can be suppressed.

In the embodiment, the engine 22 is one example of the "engine", the motor MG1 is one example of the "first motor", the inverter 41 is one example of the "first inverter", and the planetary gear 30 is one example of the "planetary gear mechanism". In addition, the motor MG2 is one example of the "second motor", the inverter 42 is one example of the "second inverter", the battery 50 is one example of the "battery", and the HV unit cooler 60 is one example of the "cooler". Furthermore, the HVECU 70, the engine ECU 24, the motor ECU 40, and the battery ECU 52 are each one example of the "electronic control unit".

The embodiment can be summarized as follows. When abnormality occurs to a cooler, a limp home travel is made by switching between first limp home travel control in which power from a motor MG2 is not used and second limp home travel control in which only the power from the motor MG2 is used based on a state of charge SOC of a battery, a first temperature difference ΔTs1 that is obtained by subtracting an element temperature Ts1 of an inverter for a motor MG1 from a first load rate limit temperature Tset1, and a second temperature difference ΔTs2 that is obtained by subtracting an element temperature Ts2 of an inverter for the motor MG2 from a second load rate limit temperature Tset2. The element temperature Ts2 of the inverter for the motor MG2 is lowered to some extent while the first limp home travel control is executed, and the element temperature Ts1 of the inverter for the motor MG1 is lowered to some extend while the second limp home travel control is executed. Therefore, a limp home travel distance can be extended by making the limp home travel by switching between the first limp home travel control and the second limp home travel control.

A mode for implementing the invention has been described so far by using the embodiment. However, the invention is not limited to such an embodiment in any manner. Needless to say, the invention can be implemented in various modes within a scope that does not depart from the gist of the invention.

The invention can be used for a hybrid vehicle manufacturing industry and the like.

What is claimed is:

1. A hybrid vehicle comprising:
   an engine;
   a first motor configured to be able to input and output power;
   a first inverter configured to drive the first motor;
   a planetary gear mechanism having three rotation elements, the three rotation elements being respectively connected to an output shaft of the engine, a rotary shaft of the first motor, and a drive shaft that is coupled to an axle shaft;
   a second motor configured to be able to input power to the drive shaft and output power from the drive shaft;
   a second inverter configured to drive the second motor;
   a battery configured to receive electric power from the first motor via the first inverter and transmit electric power to the first motor via the first inverter, the battery configured to receive electric power from the second motor via the second inverter and transmit the electric power to the second motor via the second inverter;
   a cooler configured to cool at least the first inverter and the second inverter; and
   an electronic control unit configured to control the engine, the first motor, and the second motor such that the hybrid vehicle travels not by using the power from the second motor but by using the power from the engine and the first motor in first limp home travel control, the electronic control unit configured to control the engine, the first motor, and the second motor such that the hybrid vehicle travels not by using the power from the engine and the first motor but by using the power from the second motor in second limp home travel control, the electronic control unit configured to switch between the first limp home travel control and the second limp home travel control based on a first temperature difference, a second temperature difference, and a state of charge when abnormality occurs to the cooler, the first temperature difference being a value that is obtained by subtracting an element temperature of the first inverter from a first load rate limit temperature at which load rate limitation is applied to the first motor, the second temperature difference being a value that is obtained by subtracting an element temperature of the second inverter from a second load rate limit temperature at which the load rate limitation is applied to the second motor, and the state of charge is a ratio of remaining charging capacity to full charging capacity of the battery.

2. The hybrid vehicle according to claim 1, wherein the electronic control unit is configured to shut down the second inverter while the first limp home travel control is executed, and the electronic control unit is configured to shut down the first inverter while the second limp home travel control is executed.

3. The hybrid vehicle according to claim 1, wherein the electronic control unit is configured to preferentially execute the second limp home travel control over the first limp home travel control when the state of charge is larger than an upper limit value of a normal control range.

4. The hybrid vehicle according to claim 3, wherein the electronic control unit is configured to switch between the first limp home travel control and the second limp home travel control based on condition i) and ii), when the state of charge is larger than the upper limit value of the normal control range,
   i) the first limp home travel control is executed until the first temperature difference reaches a first threshold, and
   ii) the second limp home travel control is executed until the second temperature difference reaches the first threshold.

5. The hybrid vehicle according to claim 4, wherein the electronic control unit is configured to switch from the first limp home travel control to the second limp home travel control regardless of the first temperature difference, in a case where the state of charge reaches a predetermined permissible maximum value while the first limp home travel control is executed.

6. The hybrid vehicle according to claim 1, wherein the electronic control unit is configured to switch between the second limp home travel control and the first limp home travel control based on condition iii) and iv), in a case where one of the first temperature difference and the second temperature difference is larger than a second threshold when the state of charge is within the normal control range,
   iii) the second limp home travel control is executed until the second temperature difference reaches the second threshold, and
   iv) the first limp home travel control is executed until the first temperature difference reaches the second threshold.

7. The hybrid vehicle according to claim 6, wherein the electronic control unit is configured to switch between the first limp home travel control and the second limp home travel control based on condition v) and vi), in a case where the first temperature difference and the second temperature difference are at most equal to the second threshold when the state of charge is within the normal control range,
   v) the first limp home travel control is executed until the first temperature difference reaches a third threshold that is smaller than the second threshold, and
   vi) the second limp home travel control is executed until the second temperature difference reaches the third threshold.

8. The hybrid vehicle according to claim 1 wherein the electronic control unit is configured to preferentially execute the first limp home travel control over the second limp home travel control, when the state of charge is smaller than a lower limit value of the normal control range.

9. The hybrid vehicle according to claim 8, wherein the electronic control unit is configured to switch between the first limp home travel control and the second limp home travel control based on condition vii) and viii), when the state of charge is smaller than the lower limit value of the normal control range, vii) the first limp home travel control is executed until the first temperature difference reaches a fourth threshold, and viii) the second limp home travel control is executed until the second temperature difference reaches the fourth threshold.

10. The hybrid vehicle according to claim 9, wherein the electronic control unit is configured to switch from the second limp home travel control to the first limp home travel control regardless of the second temperature difference in a case where the state of charge reaches a predetermined permissible minimum value while the second limp home travel control is executed.

* * * * *